June 24, 1930.  E. W. ROHRBACHER  1,767,311
VARIABLE TRANSMISSION OR TORQUE CONVERTER
Filed March 17, 1927
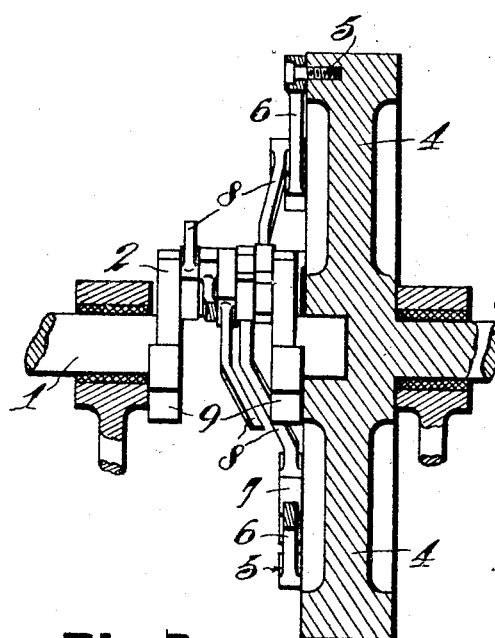
Fig.2.
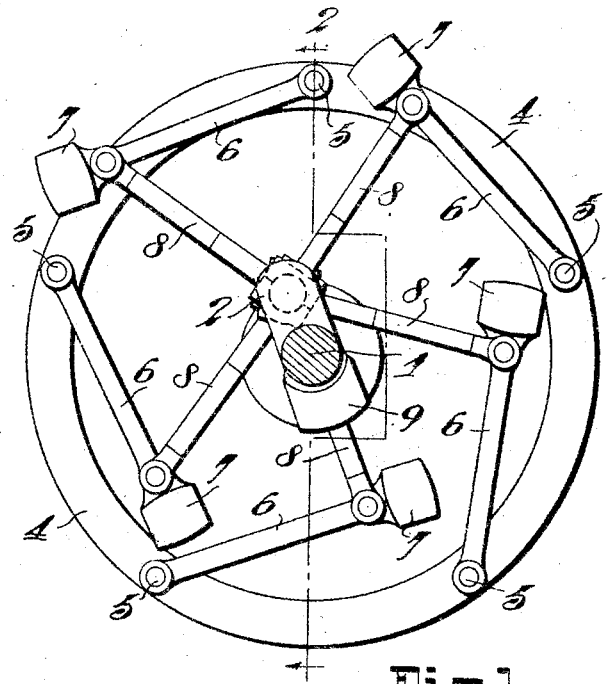
Fig.1.
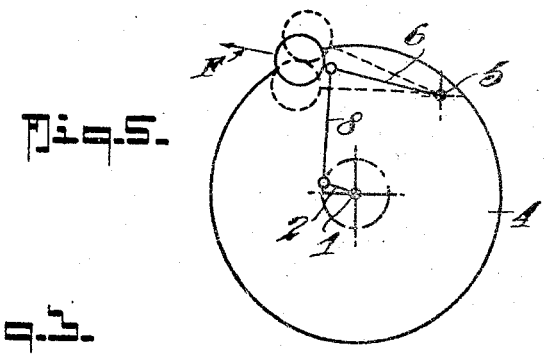
Fig.3.  Fig.4.
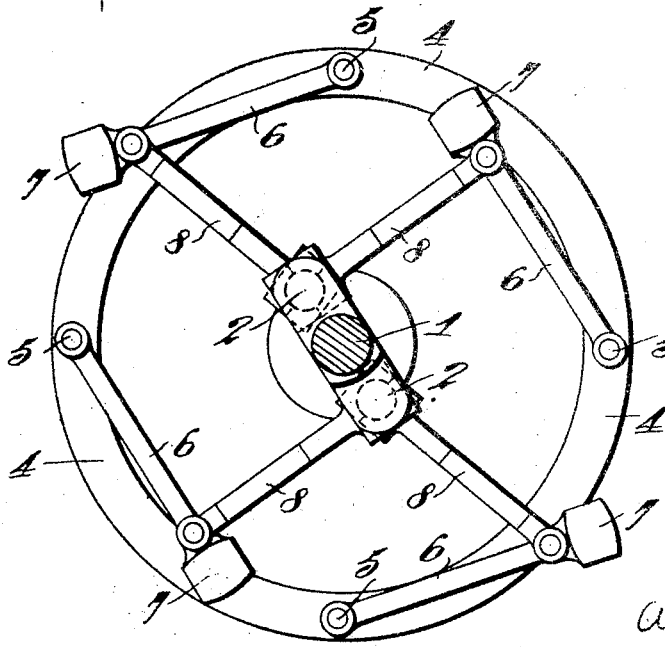
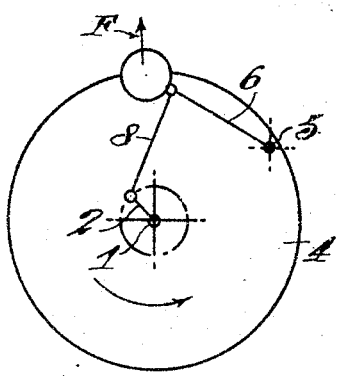
INVENTOR
Earl W. Rohrbacher
BY
ATTORNEY

Patented June 24, 1930

1,767,311

UNITED STATES PATENT OFFICE

EARL W. ROHRBACHER, OF DETROIT, MICHIGAN

VARIABLE TRANSMISSION OR TORQUE CONVERTER

Application filed March 17, 1927. Serial No. 176,151.

My invention relates to mechanism for transmitting power from one shaft to another such as from the crank shaft of an automobile engine to the driving shaft of the automobile, and the invention particularly has for its object to provide a device which will deliver a variable torque to the driven member, which torque varies in proportion to the differences in speeds between the driver and driven members, and which torque of the driven member can greatly exceed that of the driver; the device being especially designed for use in self-propelling vehicles and other machines which require a variable torque.

Other objects of the invention are to provide a device having the advantage that it will act as an elastic coupling only at high rotative speeds and below a certain speed as determined by the design and the torque transmitted it will cease acting as such; thus where the invention is used as a connection between an internal combustion engine and the drive shaft of an automobile, it will serve to prevent stalling the engine by overloading.

Another object is to provide a device of such construction that when it ceases to operate as an elastic coupling it will then act as a torque converter and variable transmission.

With other objects in view which will be clear to those skilled in the art the invention also resides in those novel features of construction, combination and arrangement of parts, all of which will be first fully described, then be specifically pointed out in the appended claims, reference being had to the accompanying drawing in which:—

Figure 1 is a side elevation illustrating one embodiment of my invention.

Figure 2 is a section on the line 2—2 of Figure 1.

Figure 3 is a view similar to Figure 2 showing a modified embodiment of my invention in which a double crank arrangement is employed on the driver shaft.

Figure 4 is a diagrammatic view illustrating how the device acts as an elastic coupling.

Figure 5 is a diagrammatic view illustrating how the device acts as a variable transmission.

Referring now to the accompanying drawing in which like numerals of reference indicate like parts in all the figures, 1 is the crank shaft which constitutes the driver and which is provided with one or more cranks 2. Aligned with the shaft 1 is the driven shaft 3 which carries a wheel or disk 4. Pivoted adjacent the periphery of the wheel or disk 4 on centers 5 are one or more arms 6, the outer ends of which carry suitable weights 7. The arms 6 are connected with the cranks 2 by links or connecting rods 8, or in any other suitable way.

Where a single crank 2 is employed with a series of weight arms, all of the links 8 may connect to the single crank (see Figures 1 and 2); where a pair of cranks 2 (see Figure 3) is provided it is preferable to provide two sets of arms 6 and links 8 connecting one set to one crank and the other set to the other crank.

Suitable counterweights 9 may be provided on the crank shaft to counterbalance the cranks 2 if found desirable.

It will be noted that the pivotal axes 5 of the arms 6 lie parallel to the axis of the crank shaft 1 and consequently the driven shaft 3.

From the foregoing it will be observed that as the crank 2 rotates, it, by means of the links or connecting rods 8, oscillates the weight or weights 7 in circular arcs with the pivots 5 as centers (a line drawn from the two ends of the arc traversed by the oscillating weight runs approximately through the center or axis of the crank shaft 1). As the weight 7 oscillates it creates a pulsating pull or force on the pivot 5. This is a centrifugal force which varies as the square of the instantaneous, tangential, linear velocity along the path of oscillation directly with the mass of weight 7, and inversely with the length of the arms 6. This force pulling on the pivotal axis at 5 creates a torque and tends to rotate or rotates the wheel 4 about its axis. Therefore it is apparent that the average torque created on the driven member 4 is proportional to the square of the difference in the rotative speeds of the driving and driven members. The wheel 4 has a mass such that, due to the polar moment of inertia thereof, the only appreciable movement of the pivotal points at 5 is unidirectional in a circle with the axis of the wheel as a center as caused by the centrifugal force above mentioned.

As will be seen by reference to Figure 4 my device has the advantage that it will act as an elastic coupling only at high rotative speeds and below a certain speed as determined by the design and the torque transmitted it will cease to act as such. Thus, when interposed between an internal combustion engine and its load, it will be impossible to stall the engine by overloading.

Referring particularly to Figure 4 which illustrates the device in its simplest form acting as an elastic coupling, assume the wheel 4 and the crank 2 to have the same rotative speeds; the former being attached to the load and the latter to the engine or prime mover. The speed is equal to or greater than a certain critical value which is determined by the torque being transmitted and the proportions used in the design of the members of the device. So operating, a centrifugal force F, acting as shown, through the linkages, counteracts the driving force imparted on the crank pin by the prime mover. From a study of Figure 4 it is apparent that the device is acting as an elastic coupling and the whole device is revolving as a unit.

When the device automatically ceases to act as an elastic coupling it will then act as a torque converter or variable transmission as will be noted by reference to Figure 5. In this figure assume the wheel 4 to which the load is connected, to be stationary and the crank 2, which is connected to the prime mover, to be rotating at a high speed, the weight 7 will then oscillate in circular arcs and create a force F (centrifugal) as shown which pulls on the periphery of the wheel 4; thus creating a torque on that member which is connected to the load. The member 4 will then begin to rotate about the same axis as the crank 2. Both members, the wheel and the crank, may rotate, but the weights continue to oscillate and create a torque as explained as long as there is a relative difference in rotative speeds between the two members.

From the foregoing description it will be apparent that my device has the following advantages:

1. It will transmit motion with an infinite number of ratios.
2. It will deliver a torque which is greater than the torque transmitted to it, when certain conditions are met.
3. The torque it delivers is entirely independent of the torque transmitted to it. The value of the delivered torque varies as the square of the difference in rotative speed between the shaft to which the crank is connected and the shaft on which the wheel of the secondary is attached. (The wheel has the oscillating weights pivoted adjacent to its periphery.)
4. The device will automatically adjust itself to that ratio required to deliver a certain torque required by the power consumption device which is attached to the secondary.

From the foregoing description, taken in connection with the accompanying drawing, it is thought that the complete construction, operation and advantages of my invention will be clear to those skilled in the art to which it relates.

What I claim is:

1. In a variable transmission and torque converter, a driving shaft and a driven shaft, a fly wheel on one shaft, a counterbalanced crank on the other shaft, a number of pendulous arms pivoted to said fly wheel, and links connecting said arms to said crank, all being arranged substantially as shown and described.

2. In a variable transmission and torque converter, a driving shaft and a driven shaft, a fly wheel on one shaft, a counterbalanced crank on the other shaft, an odd number of pendulous arms pivoted to said fly wheel, and links connecting said arms to said crank, all being arranged substantially as shown and described.

3. In a variable transmission and torque converter, a counter-balanced crank shaft constituting a driving shaft, a driven shaft with a fly wheel thereon, having a bearing to receive an end of said crank shaft, a set of pendulous arms pivoted at one end to said fly wheel near its periphery and having weights at their other ends, and a link connection between each arm and said crank shaft, substantially as specified.

4. In a variable transmission and torque converter, a driving shaft and a driven shaft, a fly wheel on one shaft, a crank having a crank pin on the other shaft, an odd number of pendulous arms with masses attached to oscillating ends, said arms being pivoted to the outer rim of said fly wheel, links connecting said arms to said crank, counterweights on said crank shaft directly opposite said crank pin.

EARL W. ROHRBACHER.